US012568932B2

(12) United States Patent
Taylor

(10) Patent No.: US 12,568,932 B2
(45) Date of Patent: Mar. 10, 2026

(54) PET PAW SCRUBBER

(71) Applicant: Chagrinovations, LLC, Naples, FL (US)

(72) Inventor: Curtis Taylor, Chagrin Falls, OH (US)

(73) Assignee: Chagrinovations, LLC, Naples, FL (US)

( * ) Notice: Subject to any disclaimer, the term of this patent is extended or adjusted under 35 U.S.C. 154(b) by 0 days.

(21) Appl. No.: 18/224,408

(22) Filed: Jul. 20, 2023

(65) Prior Publication Data

US 2024/0023517 A1     Jan. 25, 2024

Related U.S. Application Data

(60) Provisional application No. 63/390,811, filed on Jul. 20, 2022.

(51) Int. Cl.
*A01K 13/00*          (2006.01)
*A46B 9/00*           (2006.01)

(52) U.S. Cl.
CPC ............ *A01K 13/001* (2013.01); *A46B 9/005* (2013.01); *A46B 2200/1093* (2013.01)

(58) Field of Classification Search
CPC ..... A01K 13/001; A01K 13/002; A63B 60/36
See application file for complete search history.

(56) References Cited

U.S. PATENT DOCUMENTS

| | | | | |
|---|---|---|---|---|
| 430,628 | A * | 6/1890 | Decker | A01K 13/002 |
| | | | | 119/632 |
| 2,090,050 | A * | 8/1937 | Jackson | A61H 7/003 |
| | | | | 601/154 |
| 2,865,329 | A * | 12/1958 | Elliott | A01K 13/004 |
| | | | | 119/622 |
| 4,953,999 | A * | 9/1990 | Rivers | A63B 60/36 |
| | | | | 401/139 |
| 5,269,615 | A * | 12/1993 | Lewis, Jr. | A46B 9/02 |
| | | | | 401/11 |
| 6,092,256 | A * | 7/2000 | Chen | A46B 7/00 |
| | | | | 15/186 |
| 6,439,160 | B1 | 8/2002 | Wheelwright | |
| 6,745,721 | B1 | 6/2004 | Hammer | |
| 8,474,408 | B2 | 7/2013 | Leary | |
| 10,694,719 | B2 * | 6/2020 | Johnson | A01K 13/001 |
| 10,799,014 | B2 * | 10/2020 | Binnington | A46B 5/021 |
| 11,503,804 | B1 | 11/2022 | Macpherson | |
| 2005/0138745 | A1* | 6/2005 | Huang | A46B 3/22 |
| | | | | 15/187 |
| 2007/0101944 | A1* | 5/2007 | Gischel | A01K 13/001 |
| | | | | 119/613 |
| 2014/0326193 | A1* | 11/2014 | Plummer | A01J 7/04 |
| | | | | 119/664 |
| 2014/0352629 | A1 | 12/2014 | Surmeli | |
| 2019/0029224 | A1* | 1/2019 | Murphy | A46B 15/0091 |
| 2020/0040650 | A1* | 2/2020 | Harrington | A01K 13/002 |

* cited by examiner

*Primary Examiner* — Timothy D Collins
*Assistant Examiner* — Brittany A Lowery
(74) *Attorney, Agent, or Firm* — UB Greensfelder LLP; Brian E. Turung

(57)          ABSTRACT

An animal paw cleaning device that includes a brush component and a backing component that is connectable to the brush component.

18 Claims, 11 Drawing Sheets

10

10

10

10

10

10

PET PAW SCRUBBER

The present disclosed claims priority on U.S. Provisional Application Ser. No. 63/390,811 filed Jul. 20, 2022, which is incorporated herein by reference.

The disclosure relates generally to pet accessories, and more particularly to a cleaning device that can be used to clean the paws of pets or other animals.

BACKGROUND OF DISCLOSURE

Pet owners commonly are required to clean the paws of pets prior to the pet being let back into a home after being outside. Commonly, the pet owner uses a towel and/or brush to clean the paws. Generally, the brush configuration is for the cleaning of a floor, not the paw of a pet. As such, the use of common household brushes to effectively clean the paw of a pet can be challenging and difficult, especially when the pet does not want its paws cleaned. The use of a towel can be used to effectively dry the paws of a pet, but is not very effective in cleaning in the crevices of the pet paw.

In view of the current state of the art of paw cleaning products, there is a need for a paw cleaning product that is easy to use, and can effectively clean different sized paws on different sizes and breeds of pets.

SUMMARY OF THE DISCLOSURE

The present disclosure is directed to an improved animal paw cleaning device that overcomes the past deficiencies of prior art devices used to clean animal paws.

In accordance with one non-limiting aspect of the present disclosure, there is provided an animal paw cleaning device that includes a brush component and a backing component that is connectable to brush component. In one non-limiting embodiment, the brush component is releasably connected to the backing component to facilitate in the cleaning of the two components; however, this is not required.

In accordance with another and/or alternative non-limiting aspect of the present disclosure, the brush component is generally formed of a single piece of material; however, this is not required. In one non-limiting embodiment, the brush component can be formed of a molded polymer material; however, this is not required. In another non-limiting embodiment, the brush component can be a single-pieced component that is at least partially (e.g., 20-100% and all values and ranges therebetween) formed of a molded polymer material such as, but not limited to, thermoplastic elastomer (TPE) [e.g., styrenic block copolymers], TPS (TPE-s); thermoplastic polyolefinelastomers, TPO (TPE-o); thermoplastic Vulcanizates, TPV (TPE-v or TPV); thermoplastic polyurethanes, TPU (TPU); thermoplastic copolyester, TPC (TPE-E); thermoplastic polyamides, TPA (TPE-A); TPZ, etc.). In another non-limiting embodiment, the brush component is generally at least partially (e.g., 20-100% and all values and ranges therebetween) or fully formed of a flexible material; however, this is not required. In another non-limiting embodiment, the brush component can be a single-pieced component that is at least partially formed of a flexible polymer material.

In accordance with another and/or alternative non-limiting aspect of the present disclosure, the backing component can be formed of the same or different material from the brush component. In another non-limiting embodiment, the backing component can be formed of a single piece of material; however, this is not required. In another non-limiting embodiment, the backing component can be formed of a molded polymer material; however, this is not required. In one non-limiting configuration, the backing component is a single pieced component that is that is at least partially (e.g., 20-100% and all values and ranges therebetween) formed of a molded polymer material such as, but not limited to, polycarbonates (PC), and PC blends (e.g., PC/ABS, PC/PBT, PC/PET, etc.). In another non-limiting embodiment, the backing component is generally partially (e.g., 20-100% and all values and ranges therebetween) or fully formed of a less flexible material than the material used to partially or fully form the brush component; however, this is not required. In one non-limiting configuration, the backing component is a single pieced component that is that is at least partially formed of a flexible polymer material that is less flexible material than the material used to form the brush component.

In accordance with another and/or alternative non-limiting aspect of the present disclosure, the brush component includes a base portion, a plurality of bristles that are extending outwardly from a front face of the base portion, one or more optional connectors that extend outwardly from a back face of the base portion, and an optional lip that extends about the perimeter of base portion. The maximum thickness of the base portion is non-limiting. In one non-limiting embodiment, the base portion has a thickness of 0.1-0.5 inches (and all values and ranges therebetween). The number, size, shape, and configuration of bristles are non-limiting. In another non-limiting embodiment, the bristles can have a have a generally cylindrical shape and/or have generally the same length; however, it will be appreciated that the bristles can have other shapes (e.g., conical, pyramid, prism, etc.) and/or two or more bristles can have a different length, cross-sectional area and/or cross-sectional shape. In one non-limiting configuration, one or more or all of the bristles can optionally taper from the back end to the front end of the bristle; however, this is not required. One or more or all of the bristles can have the same length, the same shape, and/or the same configuration. The orientation of the bristles on the front face of the base portion is non-limiting.

In accordance with another and/or alternative non-limiting aspect of the present disclosure, the back face of the base portion is optionally recessed from the lip of the base portion. The recess configuration of the back face (when used) is configured to receive a portion (e.g., 20-100% and all values and ranges therebetween) or all of the backing component. The depth of the recess (when used) can be the same or greater than the thickness of the backing component. In one non-limiting embodiment, the depth of the recess is greater than the thickness of the backing component. In another non-limiting embodiment, the width of the lip from the edge of the base portion to the recess region (when used) is non-limiting. In another non-limiting embodiment, the width of the lip can be 0.05-0.4 inches (and all values and ranges therebetween). In another non-limiting embodiment, the base portion can optionally be absent a lip.

In accordance with another and/or alternative non-limiting aspect of the present disclosure, the back face of the base portion can optionally include one or more connectors (e.g., 1-100 and all values and ranges therebetween). The number, shape, and configuration of the one or more connectors is non-limiting. The shape and configuration of the one or more connectors can be the same or different. The location of the one or more connectors on the back face is non-limiting. In one non-limiting embodiment, one or more of the connectors can optionally have a circular cross-sectional shape; however, one or more of the connectors can have other cross-section shapes (e.g., polygonal, oval, stadium-shaped or squectangle, etc.). The cross-sectional area along the longitudinal length of one or more of the connectors can be constant or vary.

In accordance with another and/or alternative non-limiting aspect of the present disclosure, the connection arrangement on the brush component includes a slot at or near a perimeter of the brush component. The slot is configured to receive a portion of the outer perimeter of base portion to thereby releasably connect the base portion to the brush component. The slot can be located at or near a portion (e.g., 5-100% and all values and ranges therebetween) or all of the outer perimeter of the brush component.

In accordance with another and/or alternative non-limiting aspect of the present disclosure, the backing component can be formed to optionally have a non-linear configuration. For example, the backing component can optionally have a generally C-shaped or U-shaped cross-sectional shape; however, other non-linear shapes can be used. The C-shaped or U-shaped cross-sectional shape allows for the squeezing or compressing of the backing component during the use of the animal paw cleaning device. In one non-limiting configuration, when the brush component is connected to the backing component, the ends of the brush component can optionally be spaced from one another and ends of the backing component can optionally be spaced from one another. Such spacing allows a user, during use of the assembled animal paw cleaning device, to squeeze the backing component and/or the brush component to cause the spacing between the ends of the brush component and ends of the backing component to be reduced; however, causing the one or more bristles on the inner surface of the brush component to further compress against the paw and/or leg of the animal to enhance the cleaning effect of the animal paw cleaning device as the animal paw cleaning device is moved relative to the paw and/or leg of the animal. The animal paw cleaning device can be configured such that a user is able to squeeze the animal paw cleaning device until the ends of the brush component and/or ends of the backing component contact on another; however, this is not required. In another nonlimiting embodiment, the backing component and the brush component are formed of flexible materials that enable the animal paw cleaning device to return to its original or substantially original (e.g., 70-99.99% of the original shape and all values and ranges therebetween) C-shaped or U-shaped configuration after the user terminates applying a squeezing force to the animal paw cleaning device. The materials for the backing component and the brush component can be selected such that a user is able to repeatedly squeeze the animal paw cleaning device without damaging the brush component and backing component.

In accordance with another and/or alternative non-limiting aspect of the present disclosure, the backing component can include one or more connector openings that are configured to receive a portion or all of connectors on the brush component. The connector openings and the connectors can be configured to permanently or releasably connect the brush component to the backing component.

In accordance with another and/or alternative non-limiting aspect of the present disclosure, the backing component can optionally be absent connector openings. In this arrangement, a portion or all of the outer perimeter of the base portion can optionally be configured to be releasably inserted into a slot near the perimeter of the brush component to the connect base portion to the brush component.

In accordance with another and/or alternative non-limiting aspect of the present disclosure, the inner surface of the backing component can be a smooth surface; however, this is not required.

In accordance with another and/or alternative non-limiting aspect of the present disclosure, the outer face of the backing component can optionally include one or more gripping arrangements. The optional gripping arrangements (when used) can be used to facilitate in the gripping and/or squeezing or compressing of the animal paw cleaning device during use. The configuration of the optional gripping arrangements is non-limiting. Product names, logos, designs, and/or other information can be optionally formed and/or printed on outer face of the backing component.

In accordance with another and/or alternative non-limiting aspect of the present disclosure, the width and length of the backing component and the brush component are non-limiting. In one non-limiting embodiment, the width and length of the backing component can be less than width and length of the brush component; however, this is not required. In one non-limiting configuration, the length of the brush component is about 5-20 inches (and all values and ranges therebetween), and the width is about 2-10 inches (and all values and ranges therebetween). In another non-limiting embodiment, the length of brush component can optionally be greater than the width of the brush component; however, this is not required. As can be appreciated, the size of the backing component and the brush component can be selected and customized for use with differenced sized animals.

In accordance with another and/or alternative non-limiting aspect of the present disclosure, one non-limiting operation of assembling the animal paw cleaning device, when the brush component and the backing component are not pre-assembled, includes a) a user fully assembles the animal paw cleaning device by bending the brush component and then inserting the brush component into the backing component such that the connectors are partially or fully inserted into connector openings, and/or b) a user fully assembles the animal paw cleaning device by bending the brush component and then inserting the brush component into the backing component such that a portion or all of the outer perimeter of the backing component is inserted into a slot located at or near the outer perimeter of the brush component. During assembly, the backing component is formed of a slightly flexible material to facilitate in the connection of flexible brush component to the backing component. The backing component can also made of a sufficiently rigid material to maintain the flexible brush component in a generally C-shaped or U-shaped cross-sectional shape that conforms to the cross-sectional shape of the backing component after the brush component is connected to the backing component. Generally, both the backing component and the brush component are formed of a flexible material; however, the material that is used to form the backing material is generally less flexible than the material used to form the brush component; however, this is not required.

In accordance with another and/or alternative non-limiting aspect of the present disclosure, during use of the animal paw cleaning device, a user fits the animal paw cleaning device partially or fully about the paw or leg of the animal to be cleaned and then moves the animal paw cleaning device relative to the paw and/or leg (e.g., rotate the animal paw cleaning device partially or fully about the paw and/or leg or the animal, move the paw and/or leg longitudinally in a upward and/or downward motion along the paw and/or leg of the animal, etc.). During the movement the animal paw cleaning device relative to the paw and/or leg, the use can optionally squeeze or compress the backing component to cause the brush component to further compress against the paw and/or leg of the animal during the cleaning process. The animal paw cleaning device is configured such that the animal paw cleaning device can be moved along the full longitudinal length of the leg of the animal from the paw to the location where the leg terminates into the body of the animal. Such a configuration of the animal paw cleaning device enables a user to use the animal paw cleaning device to fully clean the paw and full length of the leg of the animal. Such cleaning of the paw and full length of the leg of the animal by the animal paw cleaning device can be accomplished without having to remove the animal paw cleaning device from the paw or leg of the animal, nor requires any reconfiguration of the animal paw cleaning device during the cleaning of the paw and leg of the animal. Such a configuration is an improvement over prior art paw cleaning devices that can only be used to clean the paw of an animal and only a portion of the leg of the animal.

One non-limiting object of the present disclosure is the provision of an animal paw cleaning device that comprises a backing component and a brush component; and wherein the backing component includes first and second ends and a non-linear shape along a longitudinal length of the backing component that forms a gap between said first and second ends; and wherein the first and second ends are configured to be spaced apart from one another when no compression force by a use is applied to the backing component; and wherein the first and second ends are configured to move closely adjacent to one another or contact one another when a user applies a compression force to an outer surface of the backing component at a region that is at or near the first and second ends of the backing component; and wherein the brush component is configured to be releasably connected to the backing component; and wherein the brush component includes a base portion, a plurality of bristles that extend outwardly from a front face of the base portion and a backing connection arrangement; and wherein the backing connection arrangement is configured to releasably connected to at least a portion of said backing component; and wherein the backing connection arrangement includes a) a slot arrangement positioned at least partially about an outer perimeter of the brush component and is configured to releasably receive at least a portion of an outer perimeter of said backing component, and/or b) one or more connectors that extend outwardly from a back face of the base portion and are configured to at least partially extend through one or more connector openings in the backing component.

Another and/or alternative non-limiting object of the present disclosure is the provision of an animal paw cleaning device wherein the brush component and/or the backing component are form of a single piece of flexible material, and wherein the flexible material is optionally a polymer material.

Another and/or alternative non-limiting object of the present disclosure is the provision of an animal paw cleaning device wherein the brush component is formed of a different material from a material that forms the said backing component; and wherein the backing component is optionally formed of a less flexible material than the material used to form the brush component.

Another and/or alternative non-limiting object of the present disclosure is the provision of an animal paw cleaning device wherein the brush component includes a lip that extends about a portion or all of a perimeter of the base portion; and wherein the lip optionally forms a recess region on the back face of the base portion; and wherein the recess region is optionally configured to receive at least a portion of the backing component when the backing component is releasably connected to the brush component; and wherein a depth of the recess region optionally is the same or greater than a thickness of a portion of the backing component that is optionally positioned in the recess region when the backing component is releasably connected to the brush component.

Another and/or alternative non-limiting object of the present disclosure is the provision of an animal paw cleaning device wherein the backing component optionally has a C-shape or U-shape along a longitudinal length of the backing component.

Another and/or alternative non-limiting object of the present disclosure is the provision of an animal paw cleaning device wherein the backing component includes a plurality of said connector openings; and wherein one or more of the connectors on the brush component are configured to have a connector top portion be deformable when the connector top portion is positioned through one of the connector openings and thereafter the connector top portion optionally fully or substantially reforms to an original shape of the connector top portion when the connector top portion passes through the connector opening; and wherein a cross-sectional area of the connector top portion is optionally greater than a cross-sectional area of the connector opening.

Another and/or alternative non-limiting object of the present disclosure is the provision of an animal paw cleaning device wherein a back surface of the backing component includes one or more gripping arrangements to facilitate in gripping and/or squeezing or compressing of the animal paw cleaning device during use.

Another and/or alternative non-limiting object of the present disclosure is the provision of an animal paw cleaning device wherein a width and longitudinal length of the backing component is less than a width and longitudinal length of the brush component; and wherein a longitudinal length of the brush component is optionally greater than the width of the brush component.

Another and/or alternative non-limiting object of the present disclosure is the provision of a method of cleaning an animal cleaning device comprising: a) providing an animal cleaning device; and wherein the animal paw cleaning device includes a backing component that is releasably connected to a brush component; and wherein the backing component includes first and second ends and a non-linear shape along a longitudinal length of the backing component that forms a gap between the first and second ends; and wherein the first and second ends are configured to be spaced apart from one another when no compression force by a user is applied to the backing component; and wherein the first and second ends are configured to move closely adjacent to one another or contact one another when a user applies a compression force to an outer surface of the backing component at a region that is at or near the first and second ends of the backing component; and wherein the brush component includes a base portion, a plurality of bristles that extend outwardly from a front face of the base portion and a backing connection arrangement; and wherein the backing connection arrangement is configured to be releasably connected to at least a portion of the backing component; and wherein the backing connection arrangement includes a) a slot arrangement that is positioned at least partially about an outer perimeter of the brush component and is configured to releasably receive at least a portion of an outer perimeter of the backing component, and/or b) one or more connectors that extend outwardly from a back face of the base portion and are configured to at least partially extend through one or more connector openings in the backing component; b) optionally separating the backing component from the brush component; c) cleaning the backing component and the brush component while the backing component is optionally separated from the brush component; and, d) optionally reconnecting the backing component to the brush component after the backing component and the brush component have been cleaned.

Another and/or alternative non-limiting object of the present disclosure is the provision of a method of cleaning a paw and/or leg of an animal comprising a) a) providing an animal cleaning device; and wherein the animal paw cleaning device includes a backing component that is releasably connected to a brush component; and wherein the backing component includes first and second ends and a non-linear shape along a longitudinal length of the backing component that forms a gap between the first and second ends; and wherein the first and second ends are configured to be spaced apart from one another when no compression force by a user is applied to the backing component; and wherein the first and second ends are configured to move closely adjacent to one another or contact one another when a user applies a compression force to an outer surface of the backing component at a region that is at or near the first and second ends of the backing component; and wherein the brush component includes a base portion, a plurality of bristles that extend outwardly from a front face of the base portion and a backing connection arrangement; and wherein the backing connection arrangement is configured to be releasably connected to at least a portion of the backing component; and wherein the backing connection arrangement includes a) a slot arrangement that is positioned at least partially about an outer perimeter of the brush component and is configured to releasably receive at least a portion of an outer perimeter of the backing component, and/or b) one or more connectors that extend outwardly from a back face of the base portion and are configured to at least partially extend through one or more connector openings in the backing component; b) inserting the animal cleaning device about at least a portion of the paw and/or leg of the animal; c) moving the animal cleaning device relative to the paw and/or leg of the animal to cause the plurality of bristles to clean the paw and/or leg of the animal; and, d) removing the animal cleaning device from the paw and/or leg of the animal.

Another and/or alternative non-limiting object of the present disclosure is the provision of a method of cleaning a paw and/or leg of an animal wherein the step of moving includes moving the animal cleaning device up and down along a majority or full longitudinal length of the leg of the animal without having to remove the animal cleaning device from the leg of the animal.

Another and/or alternative non-limiting object of the present disclosure is the provision of a method of cleaning a paw and/or leg of an animal wherein the step of inserting includes moving a portion of the paw or leg of the animal through the gap between the first and second ends of the backing component until the paw or leg of the animal are partially encircled by the plurality of bristles of the brush component.

Another and/or alternative non-limiting object of the present disclosure is the provision of a method of cleaning a paw and/or leg of an animal further includes the step of squeezing an outer portion of an outer surface of the backing component and/or the brush component to cause the first and second ends of the backing component to move toward one another to thereby cause a spacing of the gap to reduce or fully close; and wherein the reducing in the spacing of the gap causes an increased amount of compression of the plurality of bristles on the brush component to the paw and/or leg of the animal.

These and other objects and advantages will become apparent to those skilled in the art upon the reading and following of this description.

BRIEF DESCRIPTION OF THE DRAWINGS

The above and other objects, features and advantages of the present invention will be more clearly understood from the following detailed description taken in conjunction with the accompanying drawings, which illustrate various non-limiting embodiments that the disclosure may take in physical form and in certain parts and arrangement of parts wherein.

Figure 1:
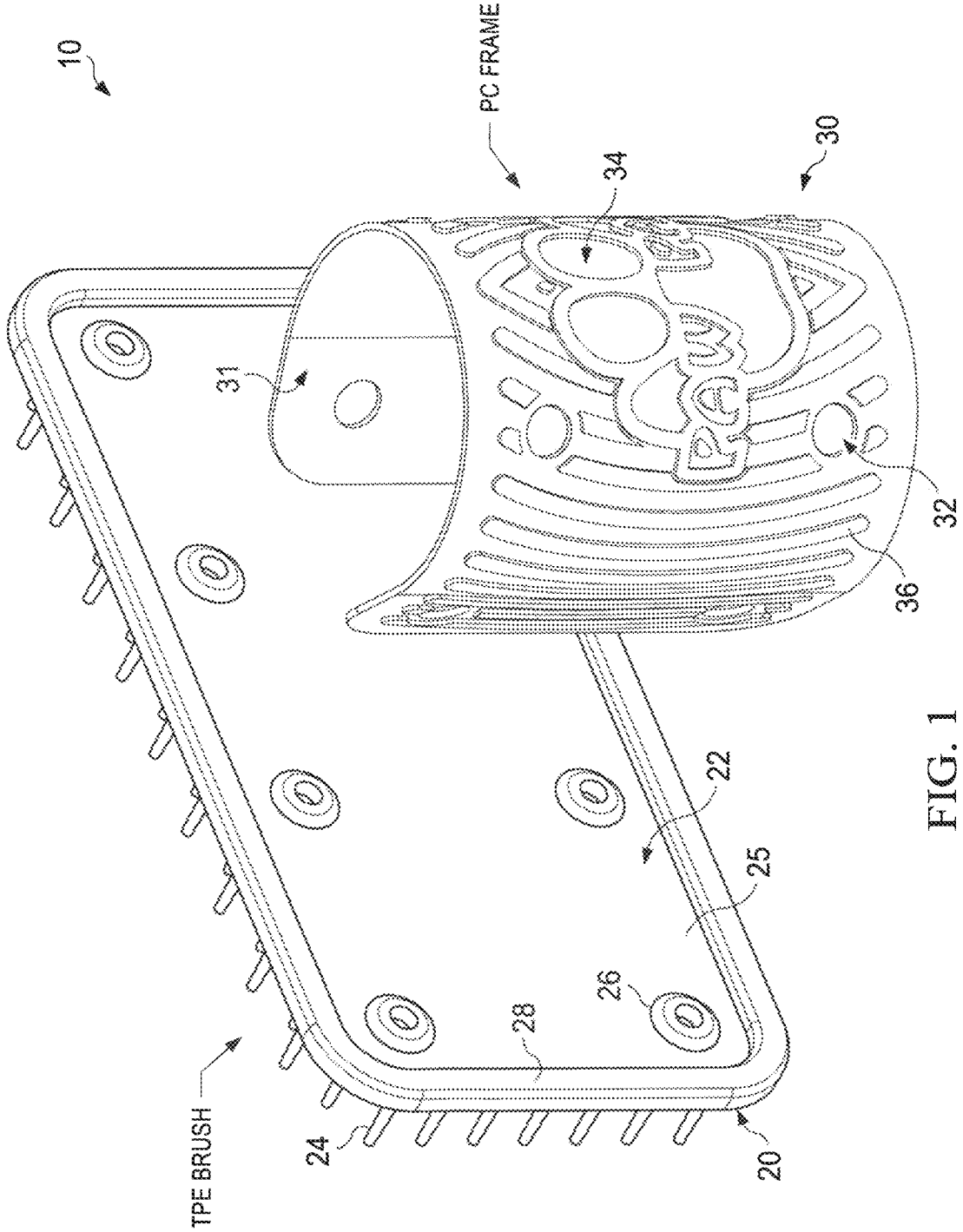
FIG. 1 is an unassembled view of one non-limiting embodiment of the animal paw cleaning device in accordance with the present disclosure.

DESCRIPTION OF NON-LIMITING
EMBODIMENTS

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Referring now to FIGS. 1-11, there is provided an animal paw cleaning device 10 that includes a brush component 20 and a backing component 30 that is connectable to brush component 20. Brush component 20 is generally formed of a single piece of material; however, this is not required. Brush component 20 can be formed of a molded polymer material; however, this is not required. In one non-limiting configuration, brush component 20 is a single-pieced component that is partially or fully formed of a molded polymer material such as, but not limited to, thermoplastic elastomer (TPE) [e.g., styrenic block copolymers], TPS (TPE-s); thermoplastic polyolefinelastomers, TPO (TPE-o); thermoplastic Vulcanizates, TPV (TPE-v or TPV); thermoplastic polyurethanes, TPU (TPU); thermoplastic copolyester, TPC (TPE-E); thermoplastic polyamides, TPA (TPE-A); TPZ, etc.). The brush component 20 is generally partially or fully formed of a flexible material; however, this is not required. Backing component 30 can be formed of the same or different material from brush component 20. Backing component 30 is generally formed of a single piece of material; however, this is not required. Backing component 30 can be formed of a molded polymer material; however, this is not required. In one non-limiting configuration, backing component 30 is a single pieced component that is that is partially or fully formed of a molded polymer material such as, but not limited to, polycarbonates (PC), and PC blends (e.g., PC/ABS, PC/PBT, PC/PET, etc.). Backing component 30 is generally partially or fully formed of a less flexible material than the material used to partially or fully form the brush component; however, this is not required. Generally, the backing material is 1.2-10 times (and all values and ranges therebetween) more rigid or less flexible than the material used to form the brush component as measured by one or more testing methods in accordance with ASTM D6272, ASTM D7264, or ASTM D7249.

Figure 2:
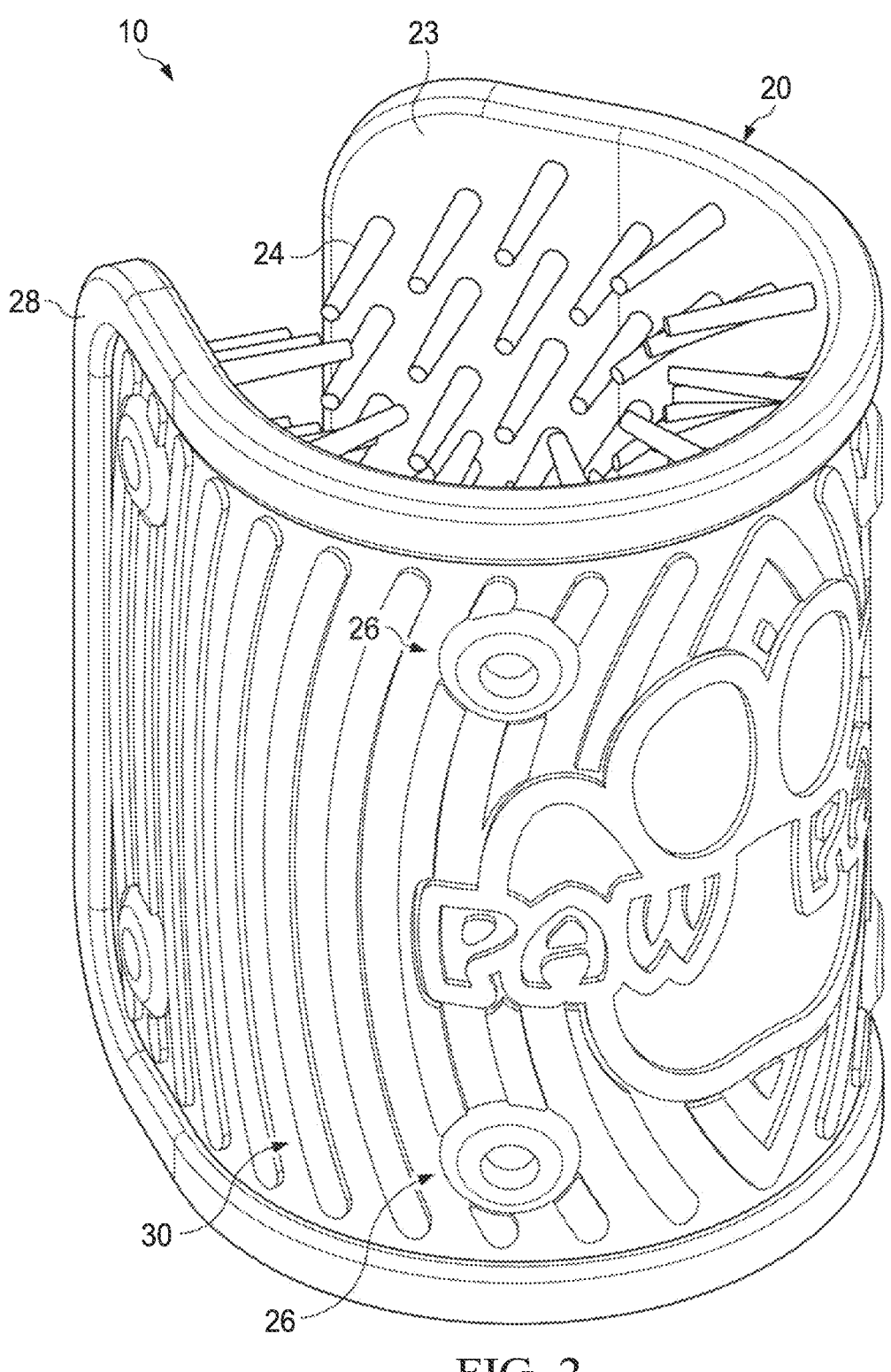
FIGS. 2 and 3 are a back elevation view of the assembled animal paw cleaning device of FIG. 1.
Figure 3:
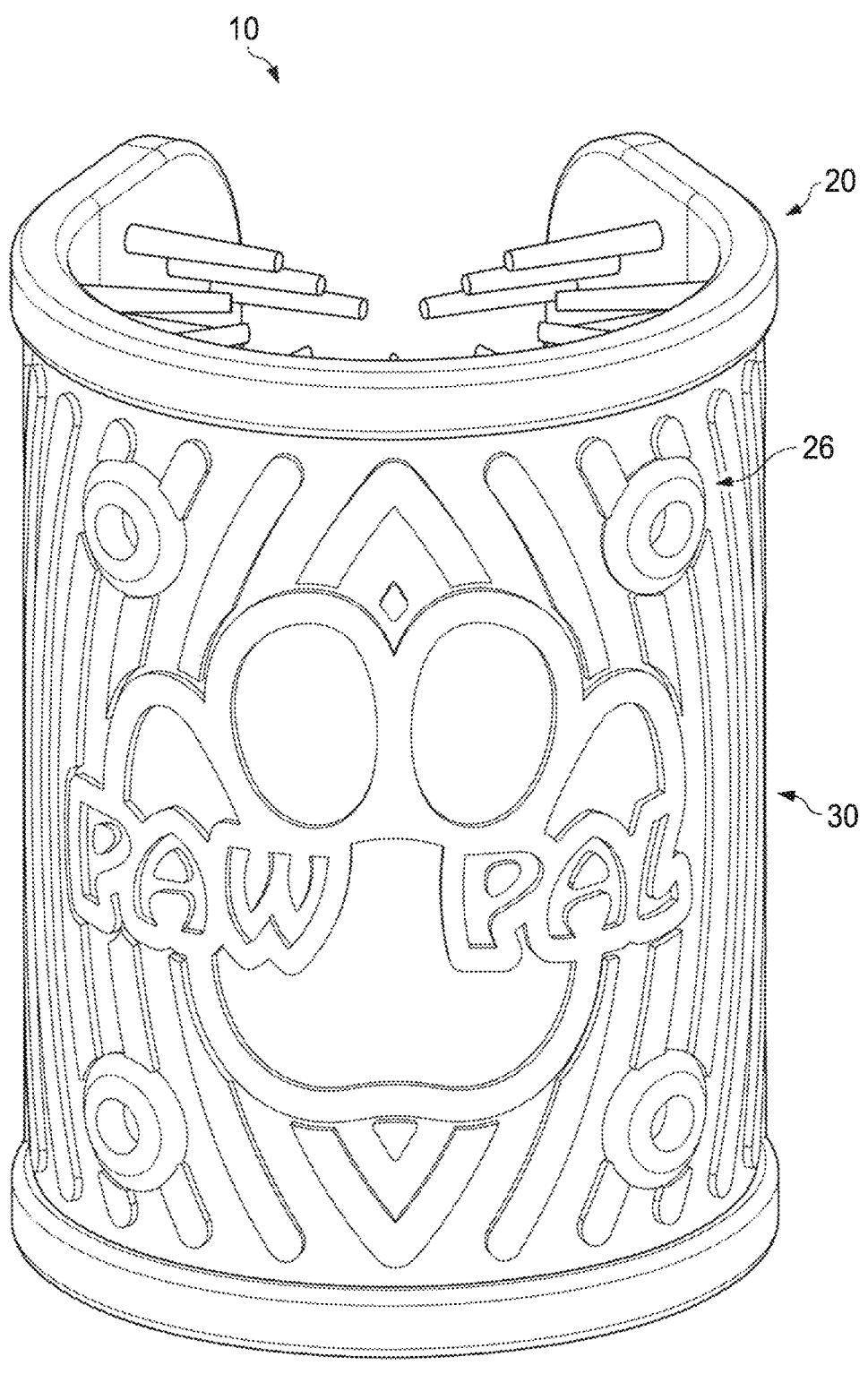
Figure 9:
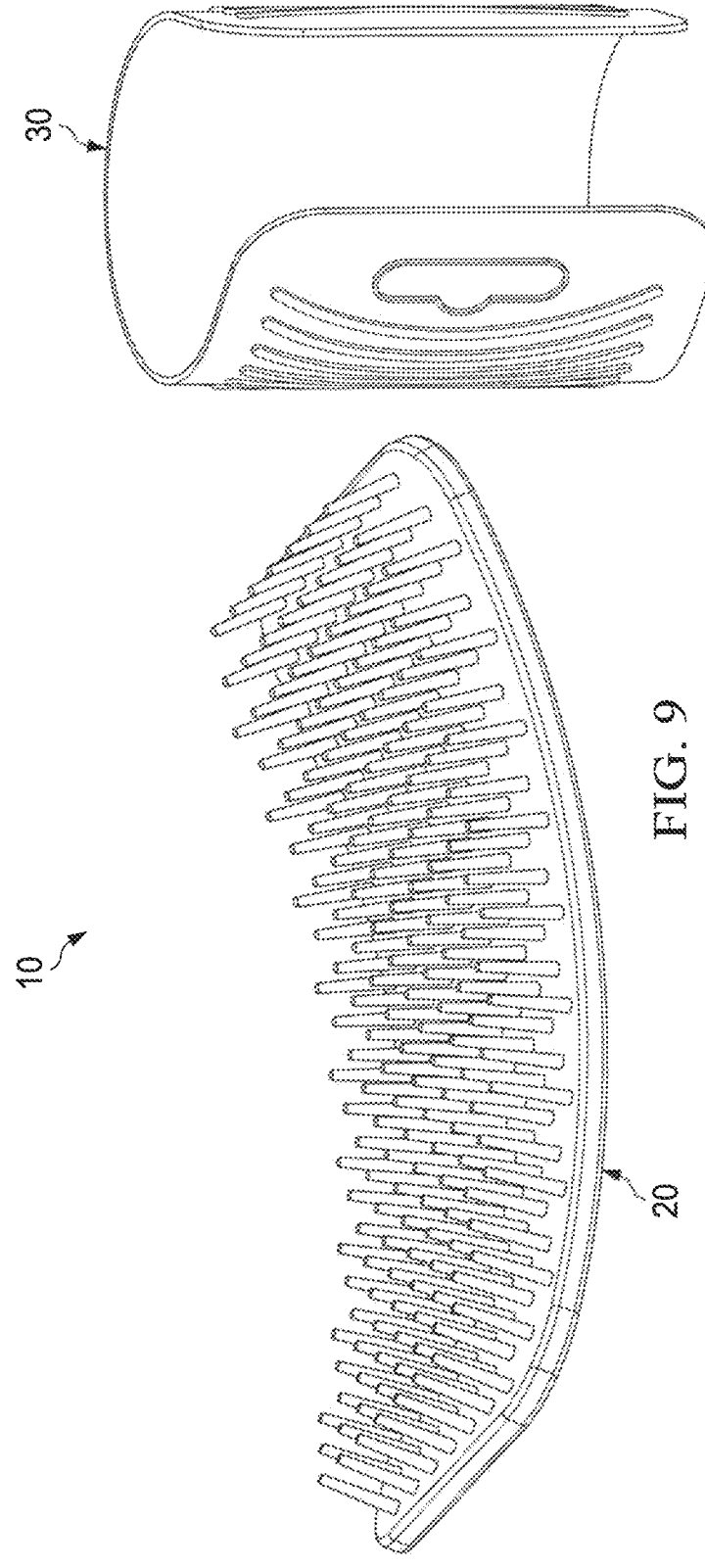
FIG. 9 is an unassembled view of the animal paw cleaning device of FIG. 7.
Figure 10:
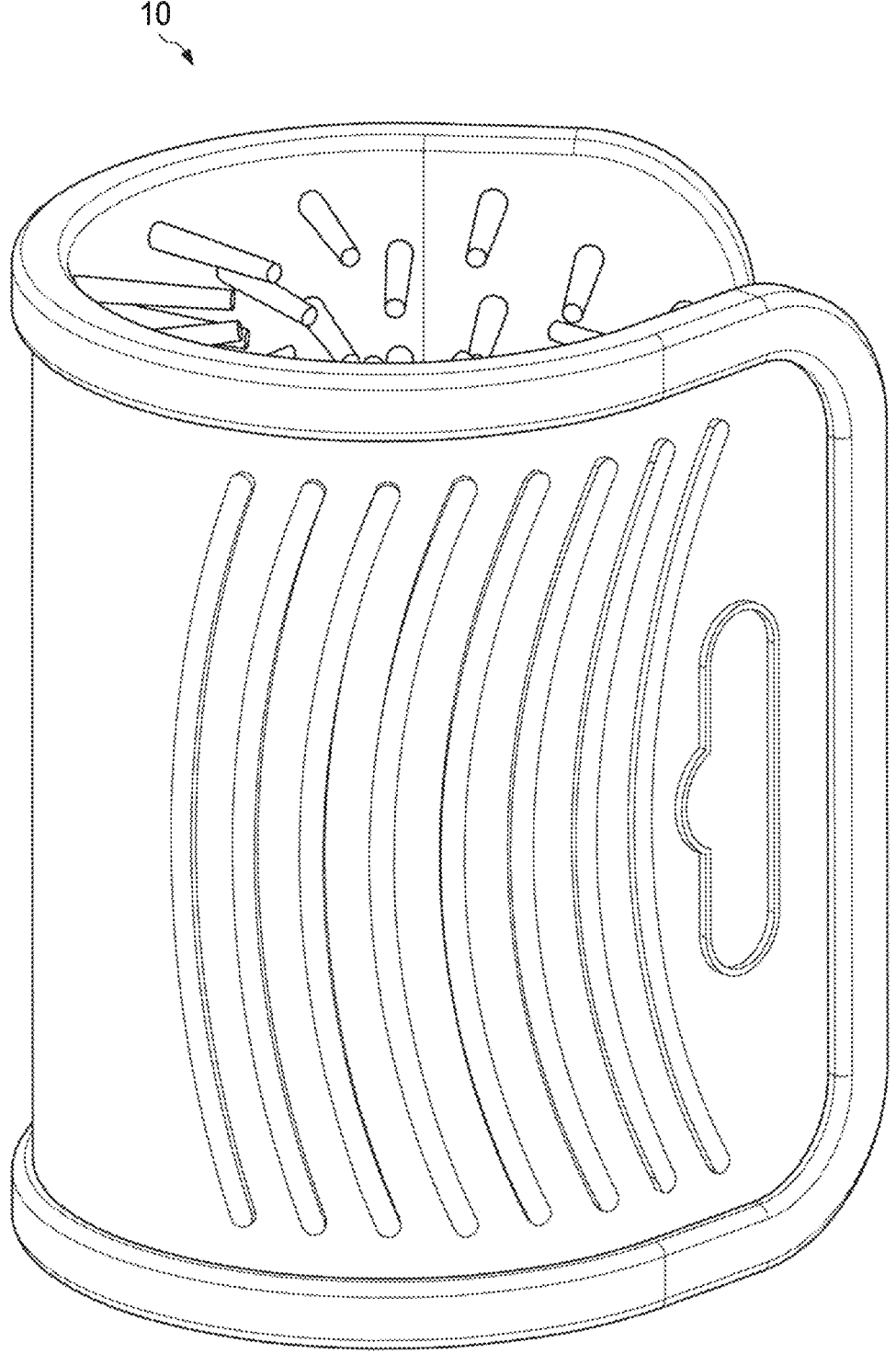
FIG. 10 is a side view of the animal paw cleaning device of FIG. 7.
Figure 11:
FIG. 11 is a front view of the animal paw cleaning device of FIG. 7.

Referring now to FIGS. 1, 2 and 9, brush component 20 includes a base portion 22, a plurality of bristles 24 extending outwardly from a front face 23 of the base portion, one or more connectors 26 extending outwardly from a back face 25 of base portion 22, and a lip 28 extending about the perimeter of base portion 22. The maximum thickness of the base portion 22 is non-limiting. In one non-limiting configuration, base portion 22 has a thickness of 0.1-0.5 inches (and all values and ranges therebetween).

The number, size, shape, and configuration of bristles 28 on the brush component are non-limiting. As illustrated in FIGS. 2 and 9, bristles 28 have a generally cylindrical shape and have generally the same length. One or more or all of bristles 28 can optionally taper from the back end to the front end of the bristle 28; however, this is not required. One or more or all of bristles 28 can have the same length, the same shape, and the same configuration. The orientation of bristles 28 on front face 23 of base portion 22 is non-limiting.

As illustrated in FIG. 1, back face 25 of base portion 22 is optionally recessed from lip 28 of base portion 20. The recess configuration of back face 25 (when used) is configured to receive a portion or all of backing component 30. The depth of the recess (when used) can be the same or greater than the thickness of backing component 30. As illustrated in FIGS. 2-4, 6-8, 10 and 11, the depth of the recess is greater than the thickness of backing component 30. The width of the lip 28 from the edge of the base portion 22 to the recess region (when used) is non-limiting.

Figure 4:
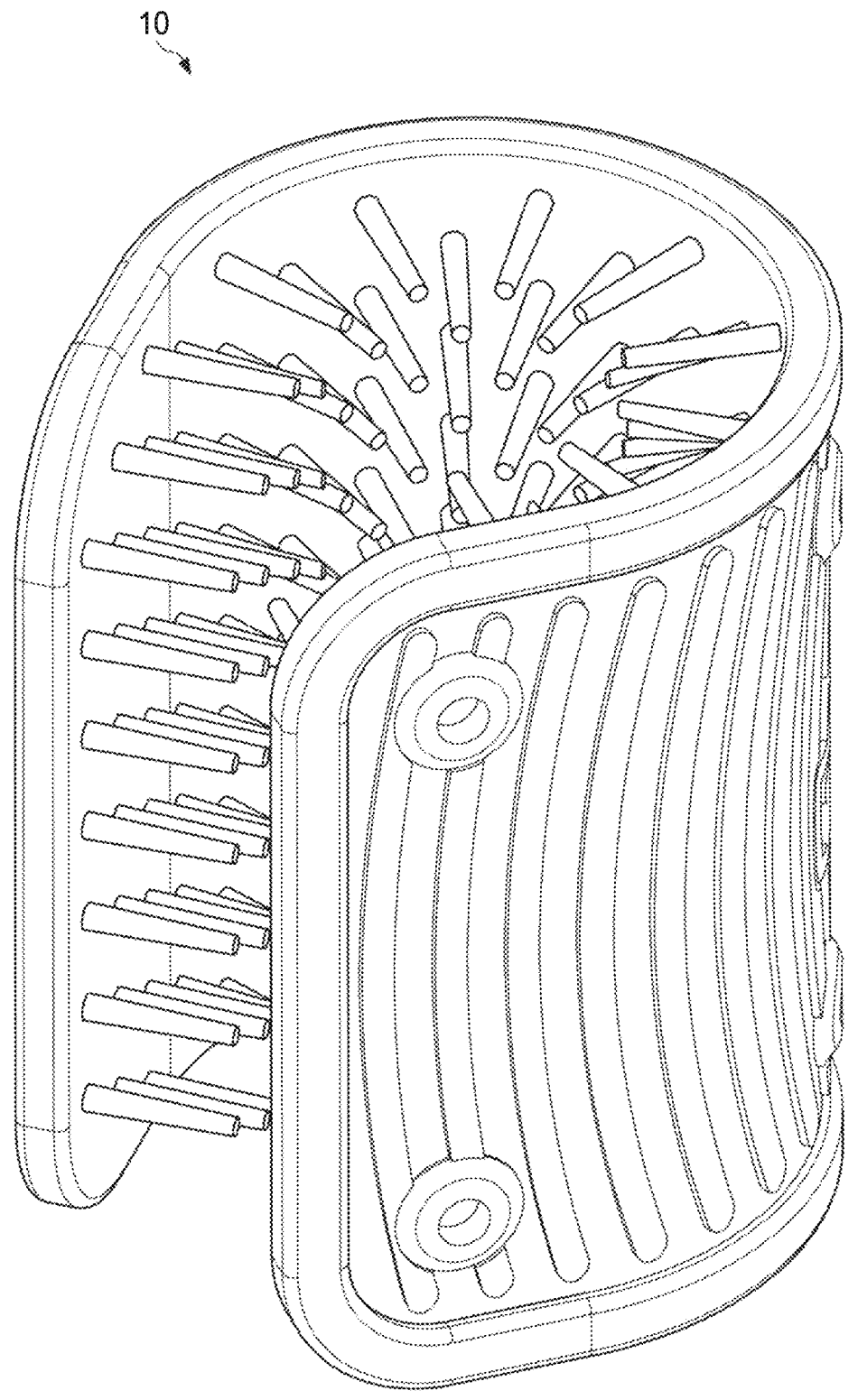
FIG. 4 is a front elevation view of the assembled animal paw cleaning device of FIG. 1.
Figure 5:
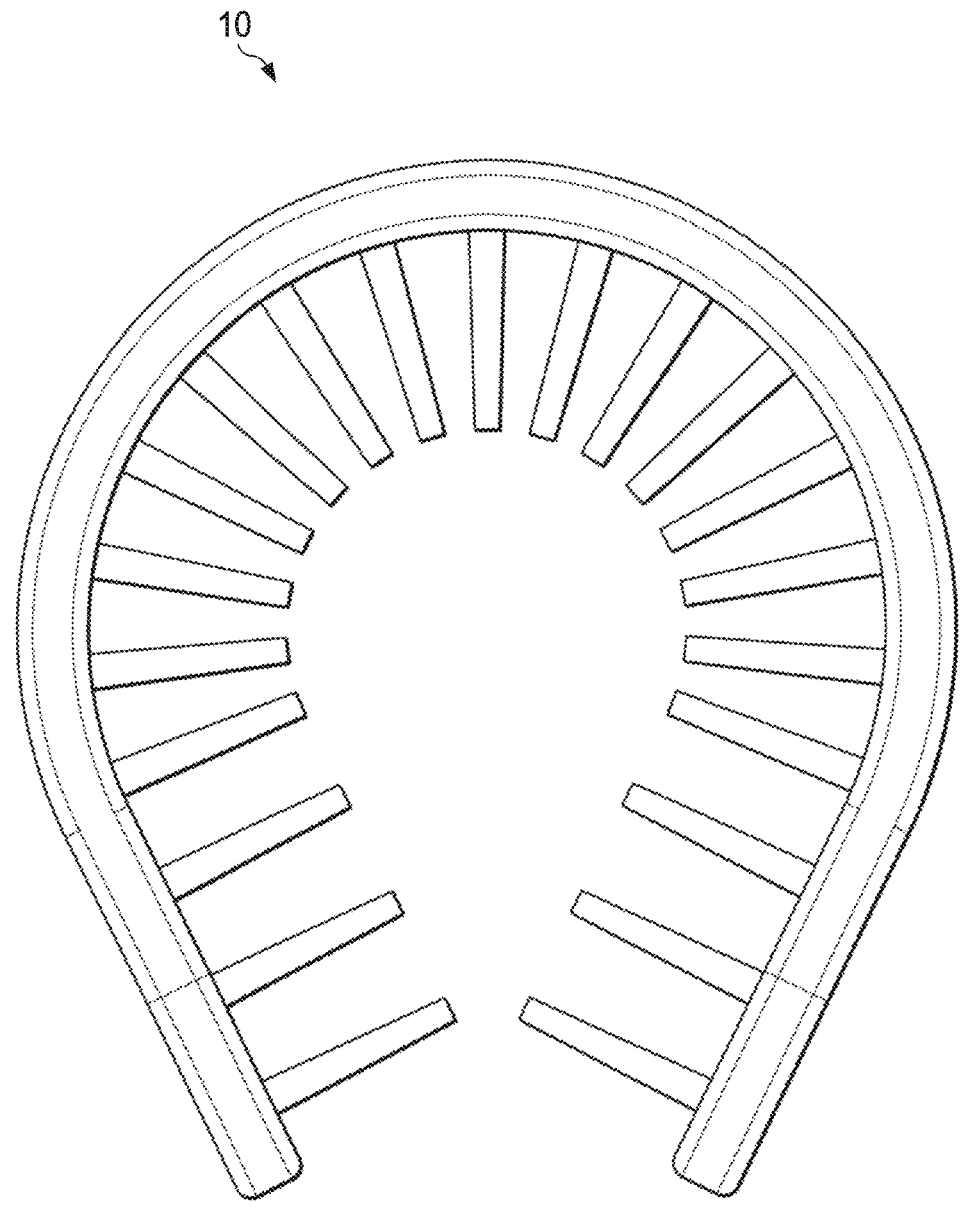
FIG. 5 is a top view of the assembled animal paw cleaning device of FIG. 1.

Referring now to FIGS. 4 and 5, the width of lip 28 in FIG. 4 (e.g., 0.25-0.4 inches) is greater than the width of lip 28 in FIG. 5 (e.g., 0.05-0.2 inches).

Figure 6:
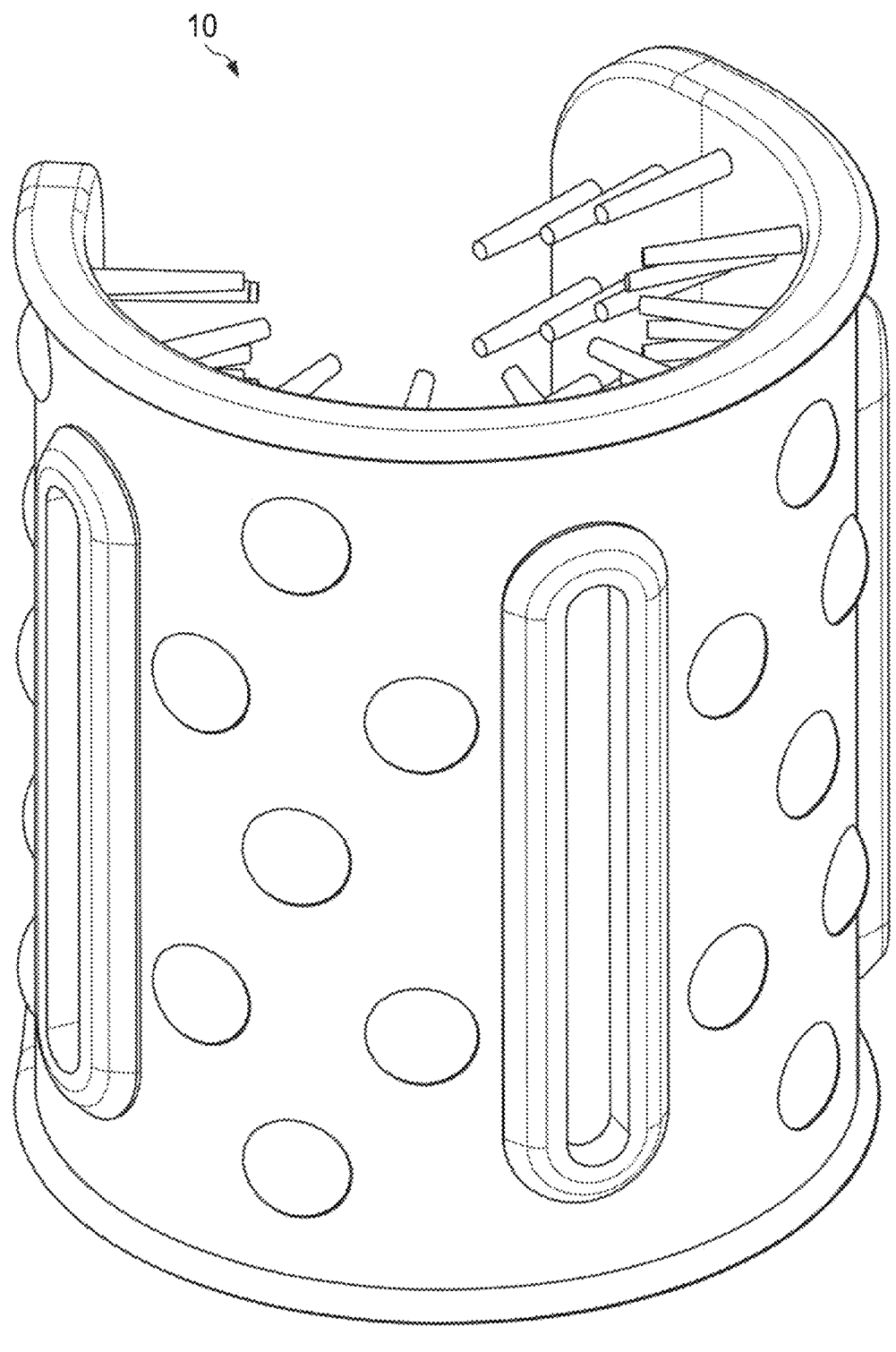
FIG. 6 is a back view of a modification of the animal paw cleaning device of FIG. 1.
Figure 7:
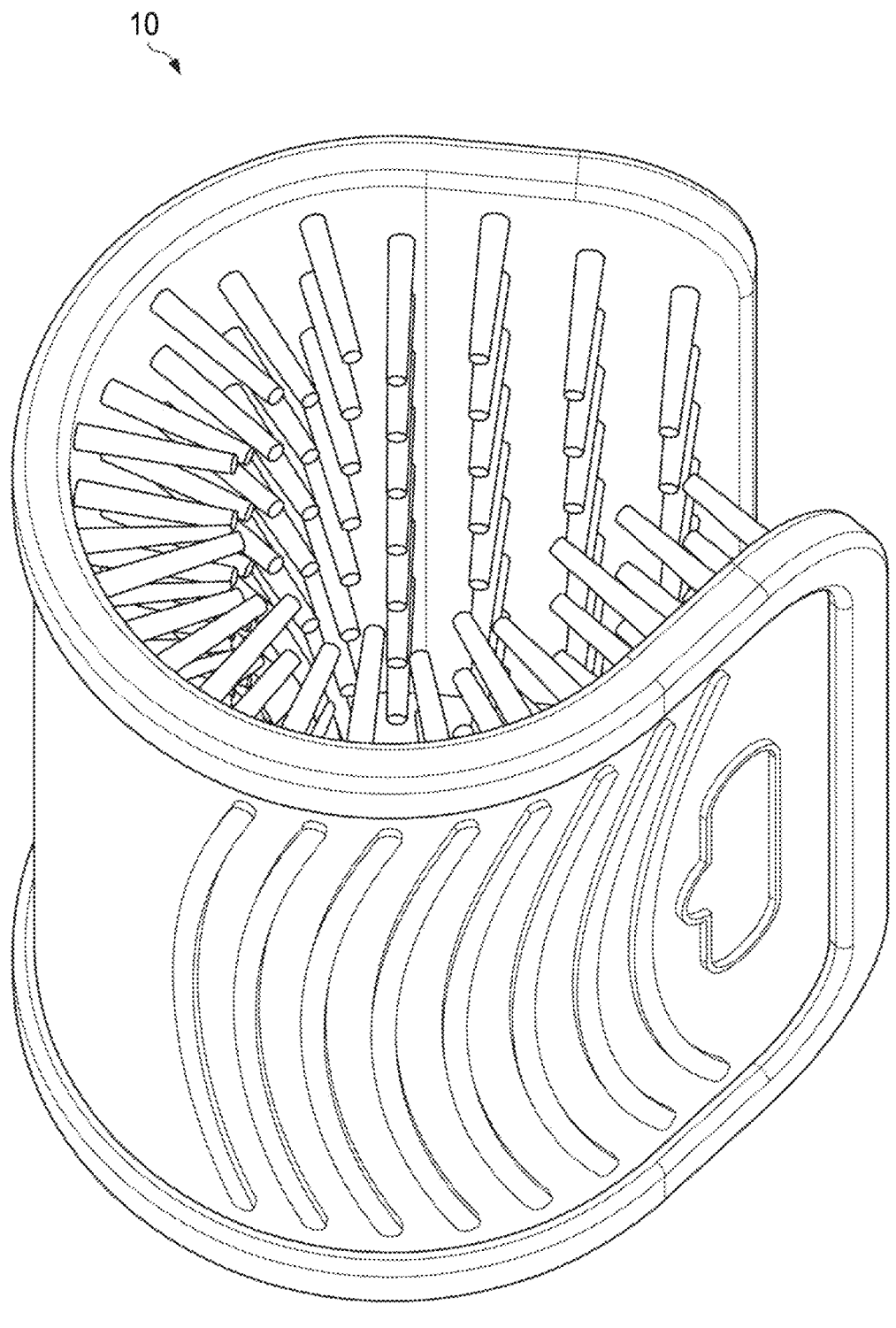
FIG. 7 is a top elevation view of another one non-limiting embodiment of the animal paw cleaning device in accordance with the present disclosure.
Figure 8:
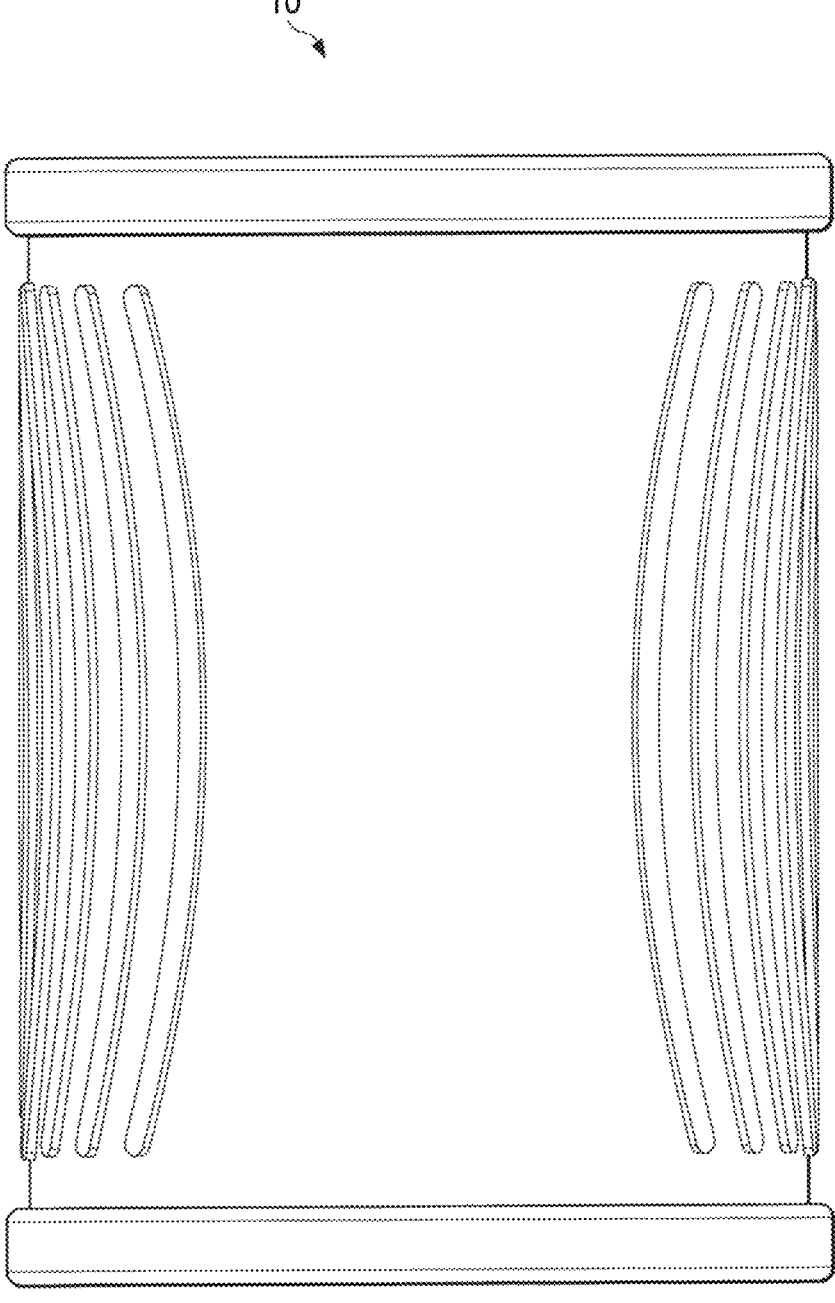
FIG. 8 is a back view of the animal paw cleaning device of FIG. 7.

Referring again to FIG. 1, back face 25 of base portion 22 includes one or more connectors 26. The number, shape, and configuration of connectors 26 is non-limiting. The shape and configuration of connectors 26 can be the same or different. The location of one or more connectors 26 on back face 25 is non-limiting. As illustrated in FIG. 1, eight connectors 26 that have a circular cross-sectional shape are located on back face 25 of the base portion 22. FIG. 6 illustrates base portion 22 including five connectors 26 that are a stadium-shaped or squectangle cross-sectional shape.

The connectors 26 illustrated in FIG. 1 have a wide top portion and a narrow lower body portion. The height or longitudinal length of the narrow lower portion is the same or greater than a thickness of the backing component at the region of the backing component 30 that is to be connected to the connector 26 such that the flexible and compressible wide top portion of the connector 26 can be caused to squeeze through the connector openings 32 in the backing component 30 and then decompress when moved fully through the connector openings 32 to thereby entrap a portion of the backing component 30 between the compressible wide top portion of the connector 26 and the back face 25 of the base portion 22. Generally, the cross-sectional area of the wide top portion is greater than the cross-sectional area of the connector openings 32 in the backing component 30. As similar arrangement exists for the connectors 26 illustrated in FIG. 6, wherein the difference lies in the shape of the connectors 26 and the shape of the connector openings 32 to thereby entrap a portion of the backing component 30.

As illustrated in FIGS. 7-10, an alternative connection arrangement is illustrated. The connection arrangement is in the form of a slot near the perimeter of brush component 20. The slot is configured to receive a portion of the outer perimeter of base portion 22 to thereby releasably connect the base portion 22 to brush component 20.

Referring again to FIGS. 1 and 9, backing component 30 is formed to have a non-linear configuration. As illustrated in FIGS. 1-11, backing component 30 is formed to have a generally C-shaped or U-shaped cross-sectional shape; however, other non-linear shapes can be used.

As discussed above, backing component 30 as illustrated in FIGS. 1-6 includes one or more connector openings 32 that are configured to receive a portion or all of connectors 26 on brush component 20. Connector openings 32 and connectors 26 can be configured to permanently or releasably connect brush component 20 to backing component 30.

In another non-limiting arrangement, the backing component 30 as illustrated in FIG. 6-11 is absent connector openings. In this arrangement, the outer perimeter of base portion 22 is configured to be releasably inserted into a slot near the perimeter of brush component 20 to connect base portion 22 to brush component 20.

Inner surface 31 of backing component 30 can be a smooth surface as illustrated in FIG. 1; however, this is not required.

Outer face 34 of the backing component can optionally include one or more gripping arrangements 36. Optional gripping arrangements 36 (when used) facilitate in the gripping of animal paw cleaning device 10 during use. The configuration of optional gripping arrangements 36 is non-limiting. Product names, logos, designs, and/or other information can be optionally formed and/or printed on outer face 34 of the backing component.

The width and length of backing component 30 and brush component 20 are non-limiting. As illustrated in FIGS. 1-11, the width and length of backing component 30 is less than width and length of brush component 20; however, this is not required. In one non-limiting configuration, the length of brush component 20 is about 5-20 inches (and all values and ranges therebetween), and the width is about 2-10 inches (and all values and ranges therebetween). Generally, the length of brush component 20 is greater than the width of brush component 20. As can be appreciated, the size of backing component 30 and brush component 20 can be selected and customized for use with differenced sized animals.

In one non-limiting operation of animal paw cleaning device 10, when brush component 20 and backing component 30 are not preassembled, a user can fully assemble animal paw cleaning device 10 by bending brush component 20 and then inserting brush component 20 into backing component 30 such that connectors 26 are partially or fully inserted into connector openings 32. During assembly, backing component 30 is formed of a slightly flexible material to facilitate in the connection of flexible brush component 20 to backing component 30. Backing component 30 is also made of a sufficiently rigid material to maintain flexible brush component in a generally C-shaped or U-shaped cross-sectional shape that conforms to the cross-sectional shape of backing component 30 after brush component 20 is connected to backing component 30 as illustrated in FIGS. 2-8, 10 and 11.

During use of animal paw cleaning device 10, a user fits animal paw cleaning device about the paw or leg of the animal to be cleaned and then moves animal paw cleaning device relative to the paw and/or leg to clean the paw and/or leg of the animal.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall there between. The disclosure has been described with reference to the certain embodiments. These and other modifications of the disclosure will be obvious from the disclosure herein, whereby the foregoing descriptive matter is to be interpreted merely as illustrative of the disclosure and not as a limitation. It is intended to include all such modifications and alterations insofar as they come within the scope of the appended claims.

To aid the Patent Office and any readers of this application and any resulting patent in interpreting the claims appended hereto, Applicant does not intend any of the appended claims or claim elements to invoke 35 U.S.C. 112(f) unless the words "means for" or "step for" are explicitly used in the particular claim.

What is claimed:

1. An animal paw cleaning device comprising: a backing component and a brush component; said backing component includes first and second ends and a non-linear shape along a longitudinal length of said backing component that forms a gap between said first and second ends; said first and second ends are configured to be spaced apart from one another when no compression force by a user is applied to said backing component; said first and second ends are configured to move closely adjacent to one another or contact one another when a user applies a compression force to an outer surface of said backing component at a region that is at or near said first and second ends of said backing component; said brush component is configured to be releasably connected to said backing component; said brush component includes a base portion, a plurality of bristles that extend outwardly from a front face of said base portion and a backing connection arrangement; said backing connection arrangement is configured to be releasably connected to at least a portion of said backing component; said backing connection arrangement including: a) a slot arrangement positioned at least partially about an outer perimeter of said brush component and configured to releasably receive at least a portion of an outer perimeter of said backing component, and b) one or more connectors that extend outwardly from a back face of said base portion and are configured to at least partially extend through one or more connector openings in said backing component; wherein said backing connection arrangement includes a lip on said brush component that is configured to extend about a perimeter of said base portion; said lip forms a recess region on said back face of said base portion; said recess region is configured to receive at least a portion of said backing component when said backing component is releasably connected to said brush component; a depth of said recess region is the same or greater than a thickness of a portion of said backing component that is positioned in said recess region when said backing component is releasably connected to said brush component; wherein a width and longitudinal length of said backing component is less than a width and longitudinal length of said brush component; said longitudinal length of said brush component is greater than said width of said brush component.

2. The animal cleaning device as defined in claim 1, wherein one or both of said brush component and said backing component is/are formed of a single piece of flexible material.

3. The animal cleaning device as defined in claim 2, wherein said brush component is formed of a different material from a material that forms said backing component; said backing component is formed of a less flexible material than said material used to form said brush component.

4. The animal cleaning device as defined in claim 1, wherein said backing component has a C-shape or U-shape along a longitudinal length of said backing component.

5. The animal cleaning device as defined in claim 1, wherein said backing connection arrangement includes a plurality of said connector openings on said backing component; each of said connectors on said brush component has a connector top portion that is configured to be deformable when said connector top portion is positioned through each of said connector openings and thereafter said connector top portion is configured to fully or substantially reform to an original shape of said connector top portion when said connector top portion passes through said connector opening; a cross-sectional area of said connector top portion is greater than a cross-sectional area of said connector opening.

6. The animal cleaning device as defined in claim 1, wherein a back surface of said backing component includes one or more gripping arrangements to facilitate in gripping and/or squeezing or compressing of said animal paw cleaning device during use.

7. An animal paw cleaning device comprising: a backing component and a brush component; said backing component includes first and second ends and a non-linear shape along a longitudinal length of said backing component; said backing component is configured to move between a compression position and a non-compression position; said first and second ends of said backing component are configured to be spaced apart from one another and a gap exists between said first and second ends in said non-compression position when no compression force is applied to an outer surface of said backing component at a region that is at or near said first and second ends of said backing component; said first and second ends of said backing component are configured to move closely adjacent to one another or contact one another in said compression position when said compression force is applied to said outer surface of said backing component at a region that is at or near said first and second ends of said backing component; said first and second ends of said backing component are positioned closer to one another when said backing component is positioned in said compression position than when said backing component is positioned in said non-compression position; said backing component is configured to move from said compressed position to said non-compressed position when said compression force is removed from said backing component; said backing component has a C-shape or U-shape cross-sectional shape along a longitudinal length of said backing component when said backing component is in said non-compression position; said backing component is formed of a different material from said brush component; said brush component and said backing component are formed of a flexible polymer material; said backing component and said brush component are each formed of a single piece of material; said brush component is configured to be releasably connected to said backing component; said brush component includes a base portion, a plurality of bristles that extend outwardly from a front face of said base portion and a backing connection arrangement; said backing connection arrangement is configured to be releasably connected to at least a portion of said backing component; said backing connection arrangement includes a) a slot arrangement positioned at least partially about an outer perimeter of said brush component and configured to releasably receive at least a portion of an outer perimeter of said backing component, and/or b) a plurality of connectors that extend outwardly from a back face of said base portion, and wherein said backing component includes a plurality of connector openings, and wherein each of said connectors is configured to at least partially extend through one of said connector openings in said backing component; wherein a width and longitudinal length of said backing component is less than a width and longitudinal length of said brush component; said longitudinal length of said brush component is greater than said width of said brush component.

8. The animal cleaning device as defined in claim 7, wherein said backing component is formed of a less flexible material than said material used to form said brush component.

9. The animal cleaning device as defined in claim 7, wherein said backing connection arrangement includes a lip on said brush component that is configured to extend about a perimeter of said base portion of said brush component; said lip forms a recess region on said back face of said base portion; said recess region is configured to receive at least a portion of an outer perimeter of said backing component when said backing component is releasably connected to said brush component; a depth of said recess region is the same or greater than a thickness of a portion of said backing component that is positioned in said recess region when said backing component is releasably connected to said brush component.

10. The animal cleaning device as defined in claim 8, wherein said backing connection arrangement includes a lip on said brush component that is configured to extend about a perimeter of said base portion of said brush component; said lip forms a recess region on said back face of said base portion; said recess region is configured to receive at least a portion of an outer perimeter of said backing component when said backing component is releasably connected to said brush component; a depth of said recess region is the same or greater than a thickness of a portion of said backing component that is positioned in said recess region when said backing component is releasably connected to said brush component.

11. The animal cleaning device as defined in claim 7, wherein said backing connection arrangement includes a plurality of connectors on said brush component and a plurality of connector openings on said backing component; each of said connectors on said brush component is configured to have a base portion and a connector top portion that is positioned on said base portion; a maximum cross-sectional area of said connector top portion is greater than a cross-sectional area of said base portion that is located adjacent to said connector top portion; said connector top portion on each of said connectors is configured to be deformable when said connector top portion is positioned through one of said connector openings; said connector top portion is configured to fully or substantially reforms to an original shape of said connector top portion when said connector top portion passes through said connector opening; a maximum cross-sectional area of said connector top portion is greater than a minimum cross-sectional area of said connector opening.

12. The animal cleaning device as defined in claim 10, wherein said backing connection arrangement includes a plurality of connectors on said brush component and a plurality of connector openings on said backing component; each of said connectors on said brush component is configured to have a base portion and a connector top portion that is positioned on said base portion; a maximum cross-sectional area of said connector top portion is greater than a cross-sectional area of said base portion that is located adjacent to said connector top portion; said connector top portion on each of said connectors is configured to be deformable when said connector top portion is positioned through one of said connector openings; said connector top portion is configured to fully or substantially reforms to an original shape of said connector top portion when said connector top portion passes through said connector opening; a cross-sectional area of said connector top portion is greater than a minimum cross-sectional area of said connector opening.

13. The animal cleaning device as defined in claim 7, wherein a back surface of said backing component includes one or more gripping arrangements to facilitate in gripping and/or squeezing or compressing of said animal paw cleaning device during use.

14. The animal cleaning device as defined in claim 12, wherein a back surface of said backing component includes one or more gripping arrangements to facilitate in gripping and/or squeezing or compressing of said animal paw cleaning device during use.

15. The animal cleaning device as defined in claim 14, wherein a width and longitudinal length of said backing component is less than a width and longitudinal length of said brush component; said longitudinal length of said brush component is greater than said width of said brush component.

16. An animal paw cleaning device comprising: a backing component; said backing component includes first and second ends and a non-linear shape along a longitudinal length of said backing component; said backing component is configured to move between a compression position and a non-compression position; said first and second ends of said backing component are configured to be spaced apart from one another and a gap exists between said first and second ends in said non-compression position when no compression force is applied to an outer surface of said backing component at a region that is at or near said first and second ends of said backing component; said first and second ends of said backing component are configured to move closely adjacent to one another or contact one another in said compression position when said compression force is applied to said outer surface of said backing component at a region that is at or near said first and second ends of said backing component; said first and second ends of said backing component are positioned closer to one another when said backing component is positioned in said compression position than when said backing component is position in said non-compression position; said backing component is configured to move from said compressed position to said non-compressed position when said compression force is removed from said backing component; said backing component has a C-shape or U-shape cross-sectional shape along a longitudinal length of said backing component when said backing component is in said non-compression position; and a brush component; said brush component is configured to be releasably connected to said backing component; said brush component includes a base portion, a plurality of bristles that extend outwardly from a front face of said base portion and a backing connection arrangement; said backing connection arrangement is configured to be releasably connected to at least a portion of said backing component; said backing connection arrangement includes a) a slot arrangement positioned at least partially about an outer perimeter of said brush component and is configured to releasably receive at least a portion of an outer perimeter of said backing component, and/or b) a plurality of connectors that extend outwardly from a back face of said base portion, and wherein said backing component includes a plurality of connector openings, and wherein each of said connectors is configured to at least partially extend through one of said connector openings in said backing component; said backing connection arrangement includes a lip on said brush component that is configured to extend about a perimeter of said base portion of said brush component; said lip forms a recess region on said back face of said base portion; said recess region is configured to receive at least a portion of an outer perimeter of said backing component when said backing component is releasably connected to said brush component; a depth of said recess region is the same or greater than a thickness of a portion of said backing component that is positioned in said recess region when said backing component is releasably connected to said brush component; and wherein said backing component is formed of a different material from said brush component; and wherein said brush component and said backing component are formed of a flexible polymer material; and wherein said backing component and said brush component are each formed of a single piece of material; and wherein said backing component is formed of a less flexible material than said material used to form said brush component; and wherein a width and longitudinal length of said backing component is less than a width and longitudinal length of said brush component; and wherein said longitudinal length of said brush component is greater than said width of said brush component.

17. The animal cleaning device as defined in claim 16, wherein said backing connection arrangement includes a plurality of connectors on said brush component and a plurality of connector openings on said backing component; each of said connectors on said brush component is configured to have a base portion and a connector top portion that is positioned on said base portion; a maximum cross-sectional area of said connector top portion is greater than a cross-sectional area of said base portion that is located adjacent to said connector top portion; said connector top portion on each of said connectors is configured to be deformable when said connector top portion is positioned through one of said connector openings; said connector top portion is configured to fully or substantially reforms to an original shape of said connector top portion when said connector top portion passes through said connector opening; a maximum cross-sectional area of said connector top portion is greater than a minimum cross-sectional area of said connector opening.

18. The animal cleaning device as defined in claim 17, wherein a back surface of said backing component includes one or more gripping arrangements to facilitate in gripping and/or squeezing or compressing of said animal paw cleaning device during use.

* * * * *